Figure 1:
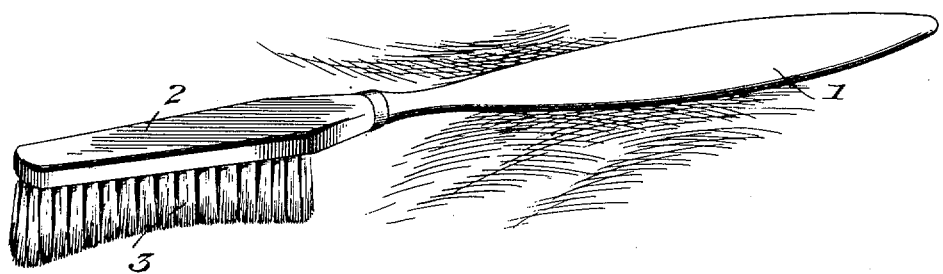

A. L. BONIN.
DETACHABLE TOOTH BRUSH.
APPLICATION FILED APR. 29, 1911.

1,020,018.

Patented Mar. 12, 1912.

Witnesses

Inventor
Alexander L. Bonin
by
his Attorney

UNITED STATES PATENT OFFICE.

ALEXANDER LEPROHON BONIN, OF MONTREAL, QUEBEC, CANADA.

DETACHABLE TOOTH-BRUSH.

1,020,018.    Specification of Letters Patent.    Patented Mar. 12, 1912.

Application filed April 29, 1911. Serial No. 624,121.

*To all whom it may concern:*

Be it known that I, ALEXANDER L. BONIN, a subject of the King of Great Britain, residing at Montreal, Province of Quebec, Canada, have invented certain new and useful Improvements in Detachable Tooth-Brushes, of which the following is a specification.

This invention relates to detachable tooth brushes.

The object of the present invention is the provision of a tooth brush having a detachable bristle-carrying head and novel means for connecting the head to the handle, whereby great strength and firmness of the joint between the head and handle is obtained with adaptability for quick and convenient separation, without the provision of any projecting metallic or objectionable parts, and wherein the joint will be of such construction that it will be water-tight, thus insuring against lodgment of foreign material or water.

In carrying out the invention I provide a bristle-carrying head of plastic material, preferably celluloid, in which is embedded and compressed during manufacture, a screw-threaded nut, and a handle of any suitable material having a screw-threaded connecting member projecting therefrom adapted to be entered in the bristle-carrying head and screwed into the nut aforesaid, together with a novel interlocking or telescoping cramping joint composed of parts on the head and handle, whereby when the parts are screwed together, a water-tight reinforcing and strengthening joint is provided which insures against the entry of foreign material or water to the screw-threaded parts and leaves the exterior of the joint smooth and without any projecting parts.

The following specification and the drawing are to be considered as illustrative, rather than restrictive, of the invention.

Figure 2:
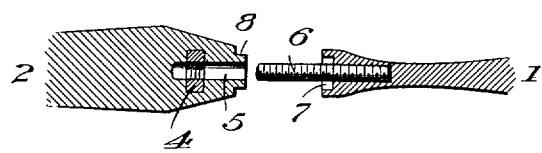
Figure 3:
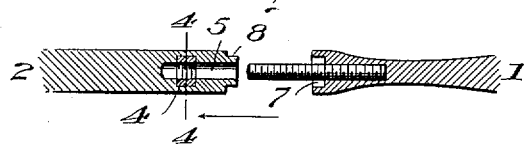
Figure 4:
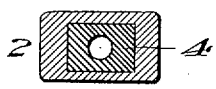
Figure 5:

In the accompanying drawings: Figure 1 is a perspective of the complete tooth brush; Figs. 2 and 3, longitudinal sections taken at right angles to each other, showing parts of the bristle-carrying head and handle with the connecting member in position for attachment together; Fig. 4, an enlarged section on line 4—4, Fig. 3; and Fig. 5, an enlarged longitudinal section through the nut.

The handle 1 may be of any preferred material, but the head 2 is of plastic material, preferably celluloid, which is well adapted for use in tooth brushes and in which the bristles 3 are suitably embedded. Embedded within the head 2 is an internally screw-threaded nut 4 which is inserted during the molding of the head and is thereby not only embedded, but securely pressed into position, whereby it is immovably held in the head. By preference, the nut 4 is of metal. The head 2 has a longitudinally extending opening or socket 5 leading inwardly from the inner end thereof in alinement with the bore of the nut 4. The handle 1 is provided with a screw stem 6 projecting centrally from the end thereof and secured thereto in any suitable manner, this stem being of a size and length to readily fit within the bore 5 and to adapt it to screw into the nut 4.

In the head there is provided a circular socket or concavity 7 and on the handle there is a round nib or projection 8 of a size adapted to fit in the concavity 7. When the stem 6 is screwed into the nut 4, the nib 8 is received in the socket 7 and cramped therein by the tension exerted on suitably screwing up the handle 1, thus providing a flush joint which prevents the admission of foreign matter or water to the metallic parts 4 and 7 and obviates rusting thereof. The nib 8 and socket 7 may be tapered to form a tighter joint or, the form thereof may be varied from that shown, all within the spirit and scope of the invention. When the handle 1 and head 2 are thus screwed together with a sufficient tension, the entrance of the nib 8 in the socket 7 causes the joint to be reinforced and prevents breaking out or distortion of the relatively thin parts of the head surrounding the bore 5, thus giving decided advantages over a mere flat face abutment of the head and handle.

Having thus described my invention, what I claim as new and desire to secure by Letters Patent, is:—

In a detachable tooth brush, the combination with a molded bristle-carrying head having an opening extending inwardly from the end thereof and at said end provided with a projection, of an internally screw-threaded member molded within the head and having its opening in line with the opening aforesaid, and a separable handle having a concavity adapted to receive said projection and a screw-threaded stem projecting centrally from within said concavity and adapted to pass into the opening and engage the threads of the member aforesaid.

In testimony whereof, I hereunto affix my signature in presence of two witnesses.

ALEXANDER LEPROHON BONIN.

Witnesses:
S. V. LOCKWOOD,
M. L. NEWCOMB.